(12) United States Patent
Kim et al.

(10) Patent No.: US 10,571,166 B2
(45) Date of Patent: Feb. 25, 2020

(54) POWER GENERATION MODULE OF VEHICLE AIR-CONDITIONING SYSTEM

(71) Applicants: Hyundai Motor Company, Seoul (KR); KIA Motors Corporation, Seoul (KR)

(72) Inventors: Jae Woong Kim, Gyeonggi-do (KR); Jae Woo Park, Gyeonggi-do (KR); So Yoon Park, Gyeonggi-do (KR); Man Ju Oh, Gyeonggi-do (KR); Sang Shin Lee, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 121 days.

(21) Appl. No.: 15/825,440

(22) Filed: Nov. 29, 2017

(65) Prior Publication Data

US 2018/0347872 A1    Dec. 6, 2018

(30) Foreign Application Priority Data

May 30, 2017    (KR) .................... 10-2017-0066544

(51) Int. Cl.
*F25B 27/02*    (2006.01)
*B60H 1/32*    (2006.01)
(Continued)

(52) U.S. Cl.
CPC ............ *F25B 27/02* (2013.01); *B60H 1/3211* (2013.01); *B60H 1/3222* (2013.01);
(Continued)

(58) Field of Classification Search
CPC ................ F25B 21/02; F25B 2321/02; B60H 2001/2275; B60H 1/00478; H01L 35/30; H01L 35/32
(Continued)

(56) References Cited

U.S. PATENT DOCUMENTS 6,034,318 A * 3/2000 Lycke .................... H01L 35/30
                                                     136/204
7,363,766 B2 * 4/2008 Eisenhour .......... B60H 1/00885
                                                     62/3.61
(Continued)

FOREIGN PATENT DOCUMENTS

KR    20130071611 A    7/2013

*Primary Examiner* — Nelson J Nieves
(74) *Attorney, Agent, or Firm* — Mintz Levin Cohn Ferris Glovsky and Popeo, P.C.; Peter F. Corless

(57) ABSTRACT

A power generation module of a vehicle air-conditioning system is provided. The air-conditioning=includes a compressor, a condenser, an expansion valve, and an evaporator. The power generation module includes a high-temperature flow channel through which a refrigerant in a high-temperature state flows and a low-temperature flow channel through which a refrigerant in a low-temperature state compared with the high-temperature flow channel flows. A thermoelectric module is provided in which heat of the high-temperature flow channel is transferred to a first side thereof, heat of the low-temperature flow channel is transferred to a second side thereof, and an electromotive force is generated by a temperature difference between the first and second sides due to the transferred heat.

12 Claims, 5 Drawing Sheets

(51) Int. Cl.
    *F25B 1/00*     (2006.01)
    *B60H 1/22*     (2006.01)

(52) U.S. Cl.
    CPC ............... *B60H 2001/2275* (2013.01); *B60H 2001/3291* (2013.01); *F25B 1/00* (2013.01)

(58) Field of Classification Search
    USPC .......................................... 62/3.2, 3.6, 3.61
    See application file for complete search history.

(56) References Cited

U.S. PATENT DOCUMENTS

| | | | | |
|---|---|---|---|---|
| 8,707,715 | B2* | 4/2014 | Okuda | H01L 35/30 62/3.2 |
| 8,789,385 | B2* | 7/2014 | Campbell | F25B 21/02 62/259.2 |
| 2003/0140636 | A1* | 7/2003 | Van Winkle | F01P 9/06 62/3.61 |
| 2007/0101740 | A1* | 5/2007 | Akei | F25B 1/00 62/238.7 |
| 2007/0101750 | A1* | 5/2007 | Pham | F25B 25/00 62/332 |
| 2008/0142068 | A1* | 6/2008 | Bean | F25B 21/02 136/201 |
| 2010/0288324 | A1* | 11/2010 | Henness | F25B 21/02 136/201 |
| 2011/0259018 | A1* | 10/2011 | Lee | F25B 21/02 62/3.2 |
| 2012/0023970 | A1* | 2/2012 | Lee | F24H 1/142 62/3.2 |
| 2012/0073309 | A1* | 3/2012 | Hung | F25B 21/02 62/3.3 |
| 2012/0169067 | A1* | 7/2012 | Ruan | F24H 4/06 290/1 R |
| 2012/0174599 | A1* | 7/2012 | Barnwell | B01D 53/265 62/3.3 |
| 2013/0055752 | A1* | 3/2013 | Fleischhacker | F25B 40/00 62/498 |
| 2014/0123695 | A1* | 5/2014 | Berg | F24F 12/00 62/331 |
| 2015/0107272 | A1* | 4/2015 | Tachibana | F25B 21/02 62/3.6 |
| 2015/0243870 | A1* | 8/2015 | Kushch | H01L 35/30 136/211 |
| 2017/0018825 | A1* | 1/2017 | Grunwald | F28F 3/08 |
| 2018/0116076 | A1* | 4/2018 | Dede | H01L 35/00 |
| 2018/0360652 | A1* | 12/2018 | Ritrivi | A61F 7/12 |

\* cited by examiner

POWER GENERATION MODULE OF VEHICLE AIR-CONDITIONING SYSTEM

CROSS-REFERENCE TO RELATED APPLICATION

This application claims the priority benefit of Korean Patent Application No. 10-2017-0066544 filed on May 30, 2017, the disclosure of which is incorporated herein by reference.

BACKGROUND

1. Field of the Invention

The present invention relates to a power generation module of a vehicle air-conditioning system, and more particularly, to a power generation module which generates power using a temperature difference generated in a flow channel of a vehicle air-conditioning system during operation of the air-conditioning system.

2. Description of the Prior Art

Generally, a vehicle includes an air-conditioning system that cools an indoor space of the vehicle to maintain a desired indoor temperature. In particular, unlike a conventional air-conditioning system for an internal combustion engine, an air-conditioning system for an environment-friendly vehicle uses latent heat of a refrigerant compressed and circulated by a compressor which is electrically driven. The conventional air-conditioning system includes, as main elements: a compressor configured to compress a refrigerant; a condenser configured to condense the refrigerant compressed in the compressor; an expansion valve configured to rapidly expand the refrigerant condensed and liquefied in the condenser; and an evaporator configured to evaporate the refrigerant expanded in the expansion valve and cool air blown into an indoor space where the air-conditioning system is installed using the latent heat of evaporation of the refrigerant; and the like.

The above-described air conditioning system operates according to a general refrigeration cycle, and a refrigerant continuously changes state from a high-temperature and high-pressure liquid state to a low-temperature and low-pressure gaseous state while sequentially and repeatedly circulating through the above-described elements so as to perform a cooling process. However, in the conventional vehicle air-conditioning system described above, waste heat is generated when a refrigerant changes state from a high-temperature and high-pressure liquid state to a low-temperature and low-pressure gaseous state, but the waste heat is emitted to the surroundings without being reused. Therefore, energy cannot be used efficiently. In addition, as environmental concerns increase, it is necessary to apply an energy regeneration device having a complicated structure to collect waste heat and generate energy. Therefore, production costs are increased, a layout become complex, and the overall weight of a vehicle increases.

The foregoing description of the background art is merely for the purpose of promoting understanding of the background of the present invention and should not be construed as an admission that the description is a prior art which is already known to a person skilled in the art.

SUMMARY

The present invention provides a power generation module of a vehicle air-conditioning system capable of collecting waste heat generated from the air-conditioning system using part of the air-conditioning system through a simplified configuration.

In order to achieve the above aspect, a power generation module of a vehicle air-conditioning system according to the present invention, the air-conditioning system including a compressor, a condenser, an expansion valve, and an evaporator, may include: a high-temperature flow channel through which a refrigerant in a relatively high-temperature state flows; as a part of the air-conditioning system, a low-temperature flow channel through which a refrigerant in a relatively low-temperature state compared with the high-temperature flow channel flows; and a thermoelectric module in which the heat of the high-temperature flow channel is transferred to a first side thereof, the heat of the low-temperature flow channel is transferred to a second side thereof, and an electromotive force may be generated by the temperature difference between the first side thereof and the second side thereof due to the transferred heat.

The thermoelectric module may include a thermal conductor configured to transfer heat of a refrigerant to the thermoelectric module, the high-temperature flow channel may include a high-temperature thermal conductor, and the low-temperature flow channel may include a low-temperature thermal conductor. The high-temperature thermal conductor and the low-temperature thermal conductor may be formed to have a size that corresponds to that of the thermoelectric module, and the power generation module may further include a case which surrounds the thermoelectric module, the high-temperature flow channel, the low-temperature flow channel, the high-temperature thermal conductor, and the low-temperature thermal conductor.

A flow-channel groove may be recessed and formed between the thermal conductor and the case to allow the high-temperature flow channel or the low-temperature flow channel to be inserted into the flow-channel groove. The thermal conductor may be formed to have a greater area than the thermoelectric module, the thermal conductor may include a recessed groove formed at a point that corresponds to the thermoelectric module, and the thermoelectric module may be inserted into the recessed groove. Therefore, the thermoelectric module may be isolated from the outside by the thermal conductor.

A heat insulation material may be disposed at a point where the high-temperature thermal conductor and the low-temperature thermal conductor meet to prevent heat transfer between the high-temperature thermal conductor and the low-temperature thermal conductor. The high-temperature thermal conductor and the low-temperature thermal conductor may be formed in a plurality of pieces and may be installed to surround the flow channels on both sides of the flow channels. The high-temperature thermal conductor may be in contact with a first side surface of the thermoelectric module and the low-temperature thermal conductor may be in contact with a second side surface of the thermoelectric module.

The thermoelectric module may be installed on the outermost side surface of the low-temperature thermal conductor to cause the outermost side surface of the low-temperature thermal conductor and the second side surface of the thermoelectric module to be in contact with each other. The high-temperature thermal conductor may include an extension part which is simultaneously in contact with the high-temperature thermal conductor and the thermoelectric module at the outermost side surface thereof. Therefore, the heat of the high-temperature thermal conductor may be transferred to the thermoelectric module by the extension part.

The low-temperature thermal conductor and the high-temperature thermal conductor may be spaced apart from each other by a predetemined interval to form an air layer, and the air layer prevents heat transfer between the high-temperature thermal conductor and the low-temperature thermal conductor. The heat insulation material may be disposed between a point where the low-temperature thermal conductor and the high-temperature thermal conductor meet to prevent heat transfer between the high-temperature thermal conductor and the low-temperature thermal conductor. The high-temperature flow channel may be disposed at a point upstream of the expansion valve with reference to the flow of a refrigerant, and the low-temperature flow channel may be disposed at a point downstream of the evaporator with reference to the flow of the refrigerant.

In the air-conditioning system, a flow channel of a refrigerant flowing out of the evaporator may be formed to guide the refrigerant using the expansion valve, the high-temperature flow channel may be disposed at a point upstream of the expansion valve with reference to the flow of the refrigerant, and the low-temperature flow channel may be disposed at a point downstream of the expansion valve after passage of the evaporator with reference to the flow of the refrigerant. The power generation module may include at least one thermoelectric module.

According to a power generation module of a vehicle air-conditioning system having the structure described above, the power generation module generates power using a flow channel at a position advantageous for increasing the amount of electricity generated by the Seebeck effect since, at the position, a high-temperature flow channel has a temperature of about 100° C. or greater and a low-temperature flow channel has a temperature at about 0° C. when the air-conditioning system is operated. Therefore, a condensing effect of decreasing the temperature of a liquid-state refrigerant of the high-temperature flow channel is shown, and the temperature of a gaseous-state refrigerant of the low-temperature flow channel increases, and thus the amount of work performed by a compressor may be reduced. Accordingly, the power generation module may increase cooling capacity and coefficient of performance (COP) in the air-conditioning system.

Therefore, the power generation module may be configured to generate power using the position and improves the performance of the air-conditioning system by recovering heat, to acquire menu-based off-cycle credit and air conditioning (A/C) efficiency credit due to the improvement in the cooling capacity of the air-conditioning system. In addition, a voltage generated by the power generation module may be used for a load device (e.g., mobile phone charging, etc.) through a direct current (DC) converter.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplar)/processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a power generation module of a vehicle air-conditioning system according to an exemplary embodiment of the present invention will be described with reference to the accompanying drawings.

Figure 1:
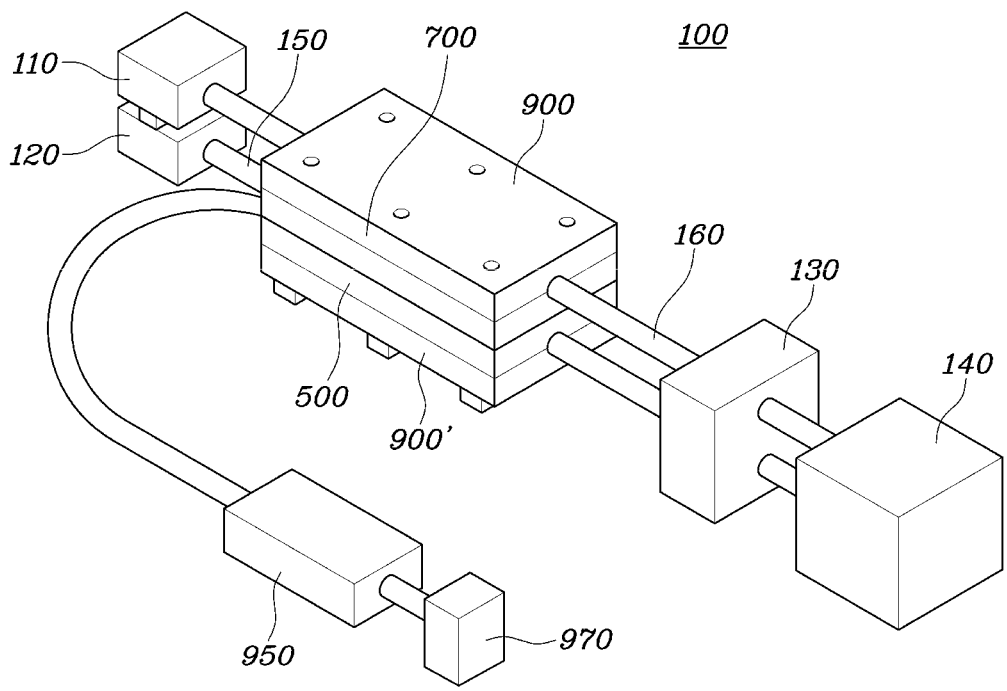
FIG. 1 illustrates a power generation module of a vehicle air-conditioning system according to an exemplary embodiment of the present invention.
Figure 2:
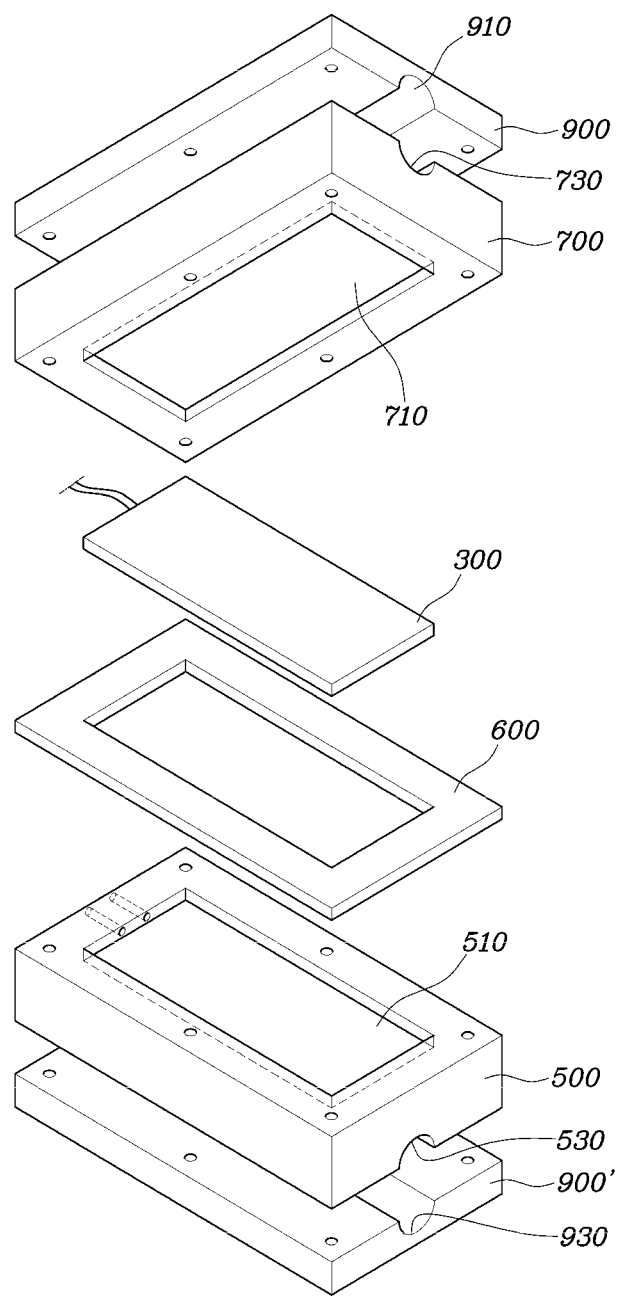
FIG. 2 is perspective detailed view of FIG. 1 according to an exemplar)/embodiment of the present invention.
Figure 3:
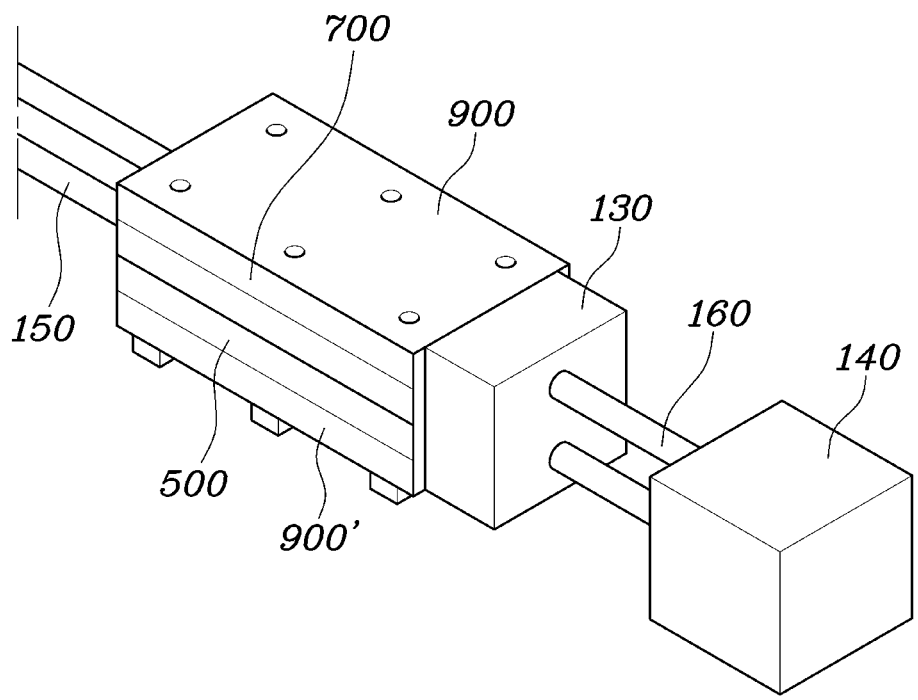
FIG. 3 illustrates a power generation module of a vehicle air-conditioning system according to the second exemplar)/embodiment of the present invention.
Figure 4:
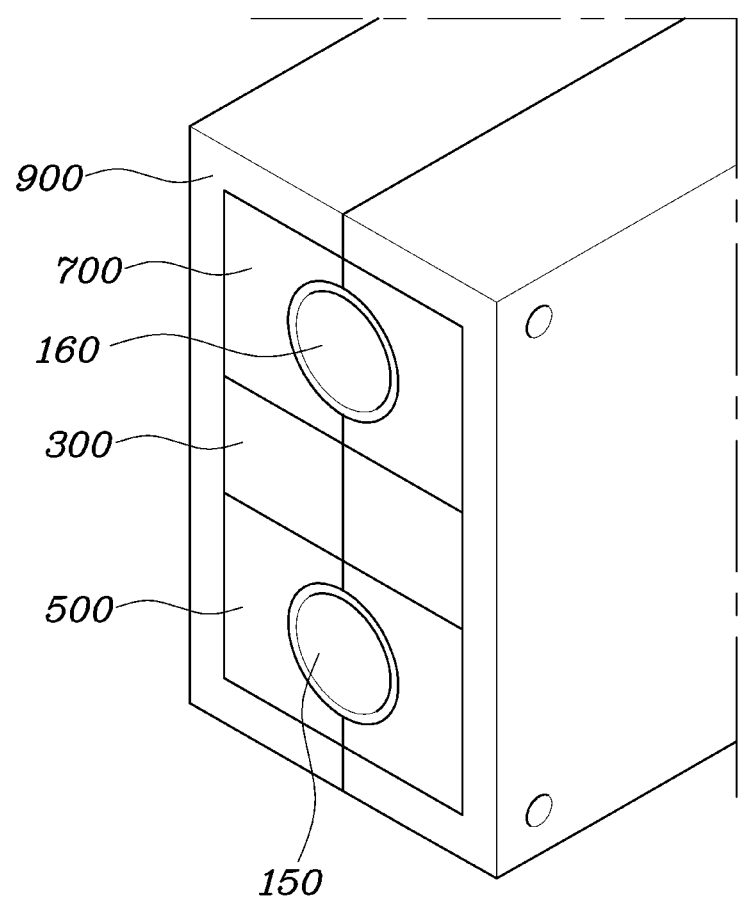
FIG. 4 illustrates a power generation module of a vehicle air-conditioning system according to the third exemplary embodiment of the present invention.
Figure 5:
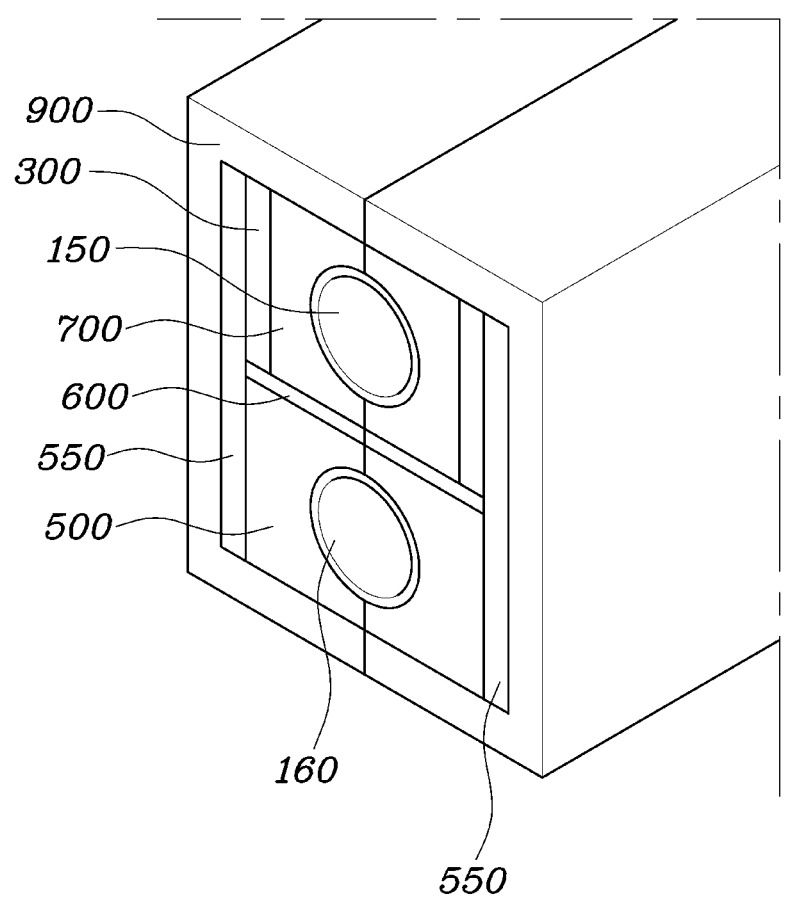
FIG. 5 illustrates a power generation module of a vehicle air-conditioning system according to the fourth exemplar)/embodiment of the present invention.

FIG. 1 illustrates a power generation module of a vehicle air-conditioning system according to an exemplaiy embodiment of the present invention, and FIG. 2 is a detailed view of FIG. 1. In addition, FIG. 3 illustrates a power generation module of a vehicle air-conditioning system according to the second exemplaiy embodiment of the present invention, FIG. 4 illustrates a power generation module of a vehicle air-conditioning system according to the third exemplary embodiment of the present invention, and FIG. 5 illustrates a power generation module of a vehicle air-conditioning system according to the fourth exemplaiy embodiment of the present invention.

A power generation module of a vehicle air-conditioning system according to an exemplary embodiment of the present invention, the air-conditioning system 100 including a compressor 110, a condenser 120, an expansion valve 130, and an evaporator 140, may include: a high-temperature flow channel 150 through which a refrigerant in a high-temperature state (e.g., about 100° C. or greater) may flow; as a part of the air-conditioning system 100, a low-temperature flow channel 160 through which a refrigerant in a low-temperature state (e.g., about 0° C.) compared with the high-temperature flow channel 150 may flow; and a thermoelectric module 300 and heat of the high-temperature flow channel 150 may be transferred to a first side of the thermoelectric module 300, heat of the low-temperature flow channel 160 may be transferred to a second side of the thermoelectric module 300, and an electromotive force may be generated by a temperature difference between the first side and the second side due to the transferred heat.

The vehicle air-conditioning system 100 typically includes a compressor 110 configured to convert a refrigerant into a high-temperature and high-pressure gas, a condenser 120 configured to liquefy the high-temperature and high-pressure gas, (a receiver drier configured to remove moisture and dust and temporarily store a refrigerant to supply an amount of refrigerant necessary for a cooling load to a evaporator 140), an expansion valve 130 configured to convert the refrigerant into a low-temperature and low-pressure frost-like form to facilitate heat exchange in the evaporator 140, and the evaporator 140 for exchanging heat with air introduced by a blower unit to generate cold air, wherein the refrigerant that has passed through the evaporator 140 repeatedly circulates to the compressor 110 again.

The high-temperature flow channel 150 is a part of the air-conditioning system 100, and refers to a portion in which a refrigerant in a high-temperature state may flow. Therefore, particularly, the high-temperature flow channel 150 may be a part where a high-temperature refrigerant may flow in the air-conditioning system 100, and the high-temperature flow channel 150 may be disposed at a point upstream of the expansion valve 130 with reference to the flow of the refrigerant. The low-temperature flow channel 160 is a part of the air-conditioning system 100, and refers to a portion in which a refrigerant in a low-temperature state may flow. Therefore, particularly, the low-temperature flow channel 160 may be a part where a low-temperature refrigerant may flow in the air-conditioning system 100, and the low-temperature flow channel 160 may be disposed at a point downstream of the evaporator 140 with reference to the flow of the refrigerant.

In addition, as described in FIG. 1 in consideration of a layout for mounting in a vehicle, in the power generation module of a vehicle air-conditioning system of the present invention, a flow channel of a refrigerant flowing out of the evaporator 140 may be structure with the refrigerant being guided by the expansion valve 130 in the air-conditioning system 100, the high-temperature flow channel 150 may be disposed at a point upstream of the expansion valve 130 with reference to the flow of the refrigerant, and the low-temperature flow channel 160 may be disposed at a point downstream of the expansion valve 130 after passage of the evaporator 140 with reference to the flow of the refrigerant. In other words, a high-temperature and high-pressure pipe disposed on the outdoor side with reference to the expansion valve 130 may operate as the high-temperature flow channel 150 and a low-temperature and low-pressure pipe may operate as the low-temperature flow channel 160. When the high-temperature and high-pressure pipe is installed on the indoor side, the temperature of the low-temperature and low-pressure liquid state refrigerant and the low-temperature and low-pressure gaseous state refrigerant may be used, and thus practicality is low. Therefore, it is recommended to install the pipe on the outdoor side rather than on the indoor side.

The heat of the high-temperature flow channel 150 may be transferred to a first side of the thermoelectric module 300, and the heat of the low-temperature flow channel 160 may be transferred to a second side of the thermoelectric module 300. The thermoelectric module 300 may include N-P type thermoelectric semiconductors, which are electrically connected in series to each other and are thermally connected in parallel to each other. Therefore, when a temperature difference occurs between the first side and the second side of the thermoelectric module 300, an electromotive force is generated and thus, the Seebeck effect, in which direct-current electricity is generated, occurs. In particular, as the electromotive force is generated and thus the power is generated in the thermoelectric module 300, a temperature on a high-temperature side may be reduced and a temperature on a low-temperature side may be increased. Therefore, an additional condensing effect may be obtained. In addition, one or more thermoelectric modules 300 may be provided as needed.

Further, the thermoelectric module 300 may include thermal conductors 500 and 700 configured to transfer the heat of a refrigerant to the thermoelectric module 300. In particular, the high-temperature flow channel 150 may include a high-temperature thermal conductor 500 and the low-temperature flow channel 160 may include a low-temperature thermal conductor 700. The high-temperature thermal conductor 500 and the high-temperature flow channel 150 may be disposed at the first side of the thermoelectric module 300 and the low-temperature thermal conductor 700 and the low-temperature flow channel 160 may be disposed at the second side of the thermoelectric module 300 with reference to the thermoelectric module 300. The high-temperature thermal conductor 500 and the low-temperature thermal conductor 700 may be formed to have a size that corresponds to the size of the thermoelectric module 300. The power generation module may further include cases 900 and 900' which surround the thermoelectric module 300, the high-temperature flow channel 150, the low-temperature flow channel 160, the high-temperature thermal conductor 500, and the low-temperature thermal conductor 700. Therefore, the thermal conductors 500 and 700 and the thermoelectric module 300 may be isolated from the outside.

Flow-channel grooves 530, 730, 910 and 930 may be recessed and formed between the thermal conductors 500 and 700 and the cases 900 and 900'. More specifically, the flow-channel grooves 530 and 930 may be formed between the high-temperature thermal conductor 500 and the cases 900 and 900', to allow the high-temperature flow channel 150 to be inserted into the flow-channel grooves 530 and 930. The flow-channel grooves 730 and 910 may be formed between the low-temperature thermal conductor 700 and the cases 900 and 900', to allow the low-temperature flow channel 160 to be inserted into the flow-channel grooves 730 and 910 and then may be fastened by a separate fastening member. Therefore, a coupling force between parts may be improved and stabilized.

In another exemplary embodiment, the thermal conductors 500 and 700 may be formed to have a greater area than the thermoelectric module 300, and the thermal conductors 500 and 700 may have recessed grooves 510 and 710 at a point that corresponds to the thermoelectric module 300. In other words, the recessed groove 510 may be formed in the high-temperature thermal conductor 500 and the recessed groove 710 may be formed in the low-temperature thermal conductor 700, and thus, the thermoelectric module 300 may be inserted into the recessed grooves 510 and 710. Therefore, the thermal conductors 500 and 700 may operate as a case, and the thermoelectric module 300 may be isolated from the outside by the thermal conductors 500 and 700. In particular, a heat insulation material 600 may be disposed at an edge point where the high-temperature thermal conductor 500 and the low-temperature thermal conductor 700 meet. Therefore, the heat insulation material 600 may prevent heat between the high-temperature thermal conductor 500 and the low-temperature thermal conductor 700 from moving without passing through the thermoelectric module 300 and may prevent thermal equilibrium from being formed, thereby improving the efficiency of the thermoelectric module 300.

In addition, the power generation module may further include the cases 900 and 900', which cover the outer surfaces of the thermal conductors 500 and 700, respectively. The cases 900 and 900' may be disposed at sides of the high-temperature thermal conductor 500 and the low-temperature thermal conductor 700, wherein the sides of the cases are opposite to the thermoelectric module 300, respectively. In particular, the cases 900 and 900' may be formed to surround and encase the thermal conductors 500 and 700, the flow channel, and the thermoelectric module 300, and the cases 900 and 900' may have the same size as the thermal conductors 500 and 700 and may cover the upper side and the lower side of the thermoelectric module 300 and the thermal conductors 500 and 700, respectively. In particular, flow-channel grooves 530, 730, 910, and 930 may be formed between the cases 900 and 900' and the thermal conductors 500 and 700, to more stably insert the high-temperature channel 150 and the low-temperature channel 160 into the flow-channel grooves 530, 730, 910, and 930.

The power generation module of a vehicle air-conditioning system of the present invention may be formed in a modular form to share the cases 900 and 900' with the expansion valve 130 as shown in FIG. 3. In particular, the production process time may be reduced and the power generation module may have a more compact shape.

The power generation module may be formed to have a vertically fastened structure as shown in FIGS. 4 to 5. As shown in FIG. 4, in the high-temperature flow channel 150, the high-temperature thermal conductor 500 through which the high-temperature flow channel 150 passes may be divided into a plurality of sections. In the low-temperature flow channel 160, the low-temperature thermal conductor 700 through which the low-temperature flow channel 160 passes may be divided into a plurality of sections. The high-temperature thermal conductor 500 and the low-temperature thermal conductor 700 may be formed to surround the high-temperature flow channel 150 and the low-temperature flow channel 160 on both sides of the high-temperature flow channel 150 and the low-temperature flow channel 160. Further, the thermoelectric module 300 may be divided into a plurality of sections between the high-temperature thermal conductor 500 and the low-temperature thermal conductor 700. Therefore, the high-temperature thermal conductor 500 may be in contact with a first side surface of the thermoelectric module 300, and the low-temperature thermal conductor 700 may be in contact with a second side surface of the thermoelectric module 300.

The cases 900 and 900' may be disposed on the outer sides of the thermal conductors 500 and 700 and the thermoelectric module 300 to surround the thermal conductors 500 and 700 and the thermoelectric module 300. Each of the thermal conductors 500 and 700, the thermoelectric module 300, and the cases 900 and 900' may be divided into two symmetric sections having a lengthwise cutting line therebetween, which guarantees a simplified assembly and is thus advantageous in the assembly and coupling thereof. However, the present invention is not limited to the structure described above. In particular, flow-channel grooves 530, 730, 910 and 930 may be formed between the cases 900 and 900' and the thermal conductors 500 and 700, to more stably insert the high-temperature flow channel 150 and the low-temperature flow channel 160 into the flow-channel grooves 530, 730, 910 and 930.

As shown in FIG. 5, the thermoelectric modules 300 may be installed on both sides of the low-temperature channel 160, respectively, in an exemplary embodiment of FIG. 4. This configuration considers that a refrigerant in the low-temperature flow channel 160 is in a gaseous state and thus has a low energy density, and a refrigerant in the high-temperature flow channel 150 is in a liquid state and thus has a high energy density. Therefore, the low-temperature thermal conductors 700 may be installed on both sides of the low-temperature flow channel 160, respectively, and the thermoelectric modules 300 may be installed on the outermost side of the low-temperature thermal conductor 700 which has a relatively low energy density, respectively.

The high-temperature flow channel 150 may include the high-temperature thermal conductors 500 installed on both sides thereof and may include an extension part 550 which is simultaneously in contact with the high-temperature thermal conductor 500 and the thermoelectric module 300 on the outermost side surface thereof. The extension part 550 may be installed to efficiently transfer heat of the high-temperature flow channel 150 to the high-temperature thermal conductor 500 and then transfer the heat up to the thermoelectric module 300. The same surface of the extension part 550 may abut the first side of the high-temperature thermal conductor 500 and the first side of the thermoelectric module 300 at the same time.

In addition, the high-temperature thermal conductor 500 and the low-temperature thermal conductor 700 may be spaced apart from each other by a predetermined interval since the high-temperature thermal conductor 500 and the low-temperature thermal conductor 700 are in contact with each other in the vertical direction with respect to the center. Therefore, an air layer 600 may be formed and the air layer 600 may prevent heat transfer between the high-temperature thermal conductor 500 and the low-temperature thermal conductor 700. Otherwise, the air layer may be a heat insulation material 600.

Therefore, the heat insulation material 600 may be installed between the high-temperature thermal conductor 500 and the low-temperature thermal conductor 700 to prevent direct heat exchange between the high-temperature thermal conductor 500 and the low-temperature thermal conductor 700. Further, the cases 900 and 900' may be disposed on the outer side of the thermal conductors 500 and 700, the thermoelectric module 300, and the extension part 550 and may be securely fastened by a fastening member. In particular, flow-channel grooves 530, 730, 910 and 930 may be formed between the cases 900 and 900' and the thermal conductors 500 and 700, to more stably insert the high-temperature flow channel 150 and the low-temperature flow channel 160 into the flow-channel grooves 530, 730, 910 and 930.

Therefore, a power generation module of a vehicle air-conditioning system according to an exemplary embodiment of the present invention may be configured to generate power using a flow channel at a position advantageous for increasing the amount of electricity generated by the Seebeck effect since, at the position, a high-temperature flow channel 150 has a temperature of about 100° C. or higher and a low-temperature flow channel 160 has a temperature near about 0° C. when the air-conditioning system 100 is operated. Therefore, a condensing effect of decreasing the temperature of a liquid-state refrigerant of the high-temperature flow channel 150 is shown, and the temperature of a gaseous-state refrigerant of the low-temperature flow channel 160 increases, and thus the amount of work performed by a compressor 110 may be reduced. Accordingly, the power generation module may increase cooling capacity and coefficient of performance (COP) in the air-conditioning system 100.

Therefore, the power generation module may be configured to generate power using the position and improves the performance of the air-conditioning system 100 by recovering heat, to acquire menu-based off-cycle credit and A/C efficiency credit due to the improvement in the cooling capacity of the air-conditioning system 100. In addition, a voltage generated by the power generation module may be used for a load device 970 (e.g., for charging mobile phones, etc.) through a DC converter 950.

Although the present invention has been shown and described with respect to the exemplary embodiments thereof, it will be apparent to a person skilled in the art that various modifications and variations may be made in the present invention without departing from the technical idea of the present invention, which is provided by the following claims.

What is claimed is:

1. A power generation module of a vehicle air-conditioning system which includes a compressor, a condenser, an expansion valve, and an evaporator, the power generation module comprising:
    a high-temperature flow channel through which a refrigerant flows;
    a low-temperature flow channel through which the refrigerant in a low-temperature state compared with the high-temperature flow channel flows; and
    a thermoelectric module in which heat of the high-temperature flow channel is transferred to a first side of the thermoelectric module, heat of the low-temperature flow channel is transferred to a second side of the thermoelectric element, and an electromotive force is generated by a temperature difference between the first side and the second side,
    wherein the thermoelectric module includes a thermal conductor configured to transfer heat of the refrigerant to the thermoelectric module,
    wherein the thermal conductor includes a high-temperature thermal conductor and a low-temperature thermal conductor,
    wherein the high-temperature flow channel contacts the high-temperature thermal conductor, and the low-temperature flow channel contacts the low-temperature thermal conductor, and
    wherein the high-temperature thermal conductor and the low-temperature thermal conductor are formed to have a size that corresponds to a size of the thermoelectric module, and the power generation module includes at least one case that surrounds the thermoelectric module, the high-temperature flow channel, the low-temperature flow channel, the high-temperature thermal conductor, and the low-temperature thermal conductor.

2. The power generation module of claim 1, wherein a flow-channel groove is recessed and formed between the high temperature thermal conductor and the case, wherein the high temperature flow channel is inserted into the flow-channel groove.

3. The power generation module of claim 1, the high-temperature thermal conductor and the low-temperature thermal conductor are formed to have a greater area than an area of the thermoelectric module, the high-temperature thermal conductor and the low-temperature thermal conductor each includes a recessed groove formed at a point that corresponds to the thermoelectric module, and the thermoelectric module is inserted into the recessed groove.

4. The power generation module of claim 3, wherein a heat insulation material is disposed at a point where the high-temperature thermal conductor and the low-temperature thermal conductor meet to prevent heat transfer between the high-temperature thermal conductor and the low-temperature thermal conductor.

5. The power generation module of claim 1, wherein the high-temperature thermal conductor and the low-temperature thermal conductor are formed in a plurality of sections and are installed to surround the high-temperature flow channel and the low-temperature flow channel.

6. The power generation module of claim 5, wherein the high-temperature thermal conductor is in contact with the first of the thermoelectric module and the low-temperature thermal conductor is in contact with the second of the thermoelectric module.

7. The power generation module of claim 5, wherein the thermoelectric module is installed on an outermost side surface of the low-temperature thermal conductor to cause the outermost side surface of the low-temperature thermal conductor and the second side of the thermoelectric module to be in contact with each other, and wherein the high-temperature thermal conductor includes an extension part which is simultaneously in contact with the high-temperature thermal conductor and the thermoelectric module at an outermost side surface of the high-temperature thermal conductor, to transfer heat of the high-temperature thermal conductor to the thermoelectric module by the extension part.

8. The power generation module of claim 7, wherein the low-temperature thermal conductor and the high-temperature thermal conductor are spaced apart from each other by a predetermined interval to form an air layer, and the air layer prevents heat transfer between the high-temperature thermal conductor and the low-temperature thermal conductor.

9. The power generation module of claim 7, wherein an heat insulation material is disposed between a point where the low-temperature thermal conductor and the high-temperature thermal conductor meet to prevent heat transfer between the high-temperature thermal conductor and the low-temperature thermal conductor.

10. The power generation module of claim 1, wherein the high-temperature flow channel is disposed at a point upstream of the expansion valve with reference to flow of the refrigerant, and the low-temperature flow channel is disposed at a point downstream of the evaporator with reference to the flow of the refrigerant.

11. The power generation module of claim 1, wherein a flow channel of the refrigerant flowing out of the evaporator is formed to guide the refrigerant by the expansion valve, the high-temperature flow channel is disposed at a point upstream of the expansion valve with reference to flow of the refrigerant, and the low-temperature flow channel is disposed at a point downstream of the expansion valve after passage of the evaporator with reference to the flow of the refrigerant.

12. The power generation module of claim 1, wherein the power generation module includes a plurality of the thermoelectric modules.

\* \* \* \* \*